(12) United States Patent
Lee et al.

(10) Patent No.: US 9,204,171 B1
(45) Date of Patent: *Dec. 1, 2015

(54) METHOD FOR ENCODING AND DECODING IMAGES BASED ON CONSTRAINED OFFSET COMPENSATION AND LOOP FILTER, AND APPARATUS THEREFOR

(71) Applicant: Electronics and Telecommunications Research Institute, Daejeon (KR)

(72) Inventors: Jin Ho Lee, Daejeon-si (KR); Hui Yong Kim, Daejeon-si (KR); Sung Chang Lim, Daejeon-si (KR); Jin Soo Choi, Daejeon-si (KR); Jin Woong Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,842

(22) Filed: Aug. 7, 2015

Related U.S. Application Data

(63) Continuation of application No. 14/347,709, filed as application No. PCT/KR2012/007833 on Sep. 27, 2012.

(30) Foreign Application Priority Data

Sep. 28, 2011  (KR) .................. 10-2011-0098601
Feb. 28, 2012  (KR) .................. 10-2012-0019999
Apr. 16, 2012  (KR) .................. 10-2012-0039412
Sep. 27, 2012  (KR) .................. 10-2012-0107639

(51) Int. Cl.
*H04N 19/44* (2014.01)
*H04N 19/82* (2014.01)
(Continued)

(52) U.S. Cl.
CPC ............. *H04N 19/82* (2014.11); *H04N 19/117* (2014.11); *H04N 19/176* (2014.11)

(58) Field of Classification Search
CPC .......... H04N 19/00375; H04N 19/117; H04N 19/159; H04N 19/176; H04N 19/46; H04N 19/82; H04N 19/86
USPC ..................................................... 375/240.02
See application file for complete search history.

(56) References Cited

U.S. PATENT DOCUMENTS

2009/0003455 A1   1/2009   Joung et al.
2012/0294353 A1*  11/2012  Fu ..................... H04N 19/70
                                                   375/240.02
(Continued)

FOREIGN PATENT DOCUMENTS

CN         1451232 A      10/2003
CN       101459847 A       6/2009
(Continued)

OTHER PUBLICATIONS

"WD4: Working Draft 4 of High-Efficiency Video Coding" Joint Collaborative Team on Video Coding (JCT-VC) of ITU-T SGI6 WP3 and ISO/IEC JTC1/SC29/WGII 6th Meeting: Torino, IT, Jul. 14-22, 2011, Document JCTVC-F803 to Bross.*

(Continued)

*Primary Examiner* — Mohammed Rahaman
(74) *Attorney, Agent, or Firm* — NSIP Law

(57) ABSTRACT

Provided are a method and apparatus for encoding and decoding images based on constrained offset compensation and a loop filter. The image decoding apparatus: receives, from an encoder, a first indicator indicating whether a sequence, a picture, a frame, a slice, a coding unit (CU), a prediction unit (PU), and/or a transform unit (TU) supports constrained offset compensation; receives, from the encoder, a second indicator indicating whether constrained sample adaptive offset (SAO) compensation or an adaptive loop filter (ALF) is applied; receives a parameter from the encoder; and applies the SAO compensation or the ALF to pixels of a restored image on the basis of the second indicator and the parameter.

2 Claims, 12 Drawing Sheets

(51) Int. Cl.
*H04N 19/117* (2014.01)
*H04N 19/176* (2014.01)

(56) References Cited

U.S. PATENT DOCUMENTS

| | | |
|---|---|---|
| 2013/0003829 A1 | 1/2013 | Misra et al. |
| 2013/0051454 A1 | 2/2013 | Sze et al. |
| 2013/0101035 A1 | 4/2013 | Wang et al. |
| 2014/0219337 A1 | 8/2014 | Lee et al. |
| 2014/0286396 A1 | 9/2014 | Lee et al. |

FOREIGN PATENT DOCUMENTS

| | | |
|---|---|---|
| CN | 101491102 A | 7/2009 |
| CN | 101778286 A | 7/2010 |
| EP | 1 574 995 A1 | 9/2005 |
| KR | 10-2005-0099256 A | 10/2005 |
| KR | 10-0896291 B1 | 5/2009 |
| KR | 10-2010-0135638 A | 12/2010 |
| KR | 10-2011-0068897 A | 6/2011 |
| WO | WO 2008/033595 A2 | 3/2008 |
| WO | WO 2013/048151 A1 | 4/2013 |

OTHER PUBLICATIONS

Bordes, P., Clare, G., Henry, F., Raulet, M., & Viéron, J. "An overview of the emerging HEVC standard" In *IEEE 2010* (4 pages).

Fu, Chih-Ming, et al. "CE13: Sample Adaptive Offset with LCU-Independent Decoding", Joint Collaborative Team on Video Coding (JCT-VC) of ITU-T SG16 WP3 and ISO/IEC JTC1/SC29/VVG11 5th Meeting: Geneva, CH, [JCTVC-E049], Mar. 16-23, 2011 (7 pages, in English).

Sullivan, G. et al., "Meeting report of the sixth meeting of the Joint Collaborative Team on Video Coding (JCT-VC), Torino, IT, Jul. 14-22, 2011", Joint Collaborative Team on Video Coding (JCT-VC) of ITU-T SG16 WP3 and ISO/IEC JTC1/SC29/WG11 6th Meeting: Torino, IT, Jul. 14-22, 2011 (4 pages in English).

Fu, Chih-Ming, et al. "Sample Adaptive Offset for Chroma", Joint Collaborative Team on Video Coding (JCT-VC) of ITU-T SG16 WP3 and ISO/IEC JTC1/SC29/WG11 6th Meeting: Torino, IT, [JCTVC-F057], Jul. 14-22, 2011 (5 pages, in English).

Bross, Benjamin, et al. "WD4: Working Draft 4 of High-Efficiency Video Coding", Joint Collaborative Team on Video Coding (JCT-VC) of ITU-T SG16 WP3 and ISO/IEC JTC1/SC29/WG11 6th Meeting: Torino, IT, [JCTVC-F803_d1] (version 3), Jul. 14-22, 2011 (6 pages, in English).

Bross, Benjamin, et al. "WD5: Working Draft 5 of High-Efficiency Video Coding." Joint Collaborative Team on Video Coding (JCT-VC) of ITU-T SG16 WP3 and ISO/IEC JTC1/SC29/WG11 7th Meeting: Geneva, Switzerland [JCTVC-G1103_d8], Nov. 2011 (5 pages, in English).

International Search Report issued Feb. 18, 2013 in corresponding International Patent Application No. PCT/KR2012/007833 (4 pages, in Korean), Machine Translation Attached.

Korean Office Action issued Oct. 18, 2013 in corresponding Korean Patent Application No. 10-2012-0107639 (4 pages, in Korean), Machine Translation Attached.

Japanese Office Action mailed Sep. 30, 2014 in counterpart Japanese Application No. 2014-083073 (4 pages, in Japanese), Machine Translation Attached.

Non-Final Office Action mailed Oct. 23, 2014 in parent U.S. Appl. No. 14/347,709 (15 pages, in English).

Chinese Office Action issued by SIPO on Dec. 25, 2014 for the corresponding CN Application. 201280058538.7 (19 pages with complete English Translation).

\* cited by examiner

FIG. 10
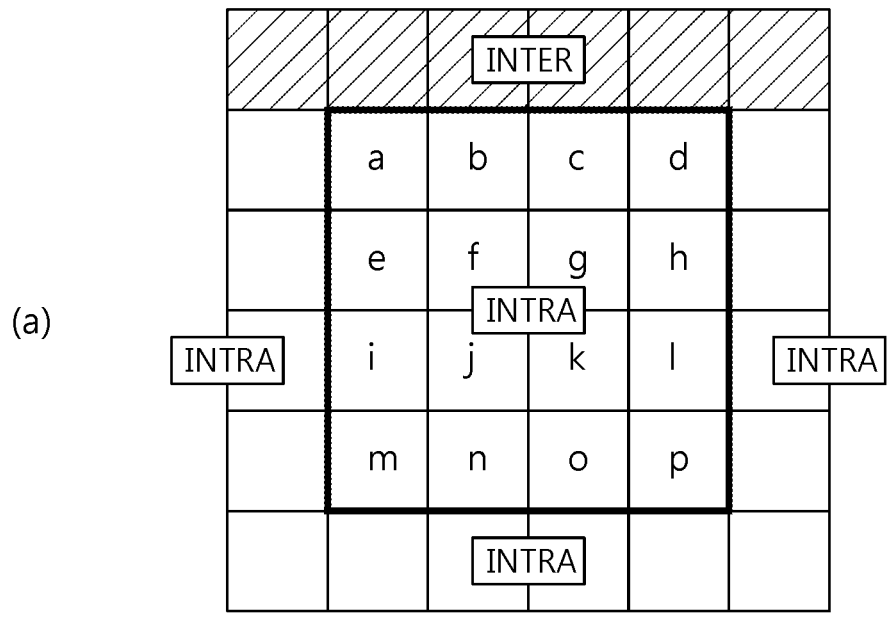
(a)
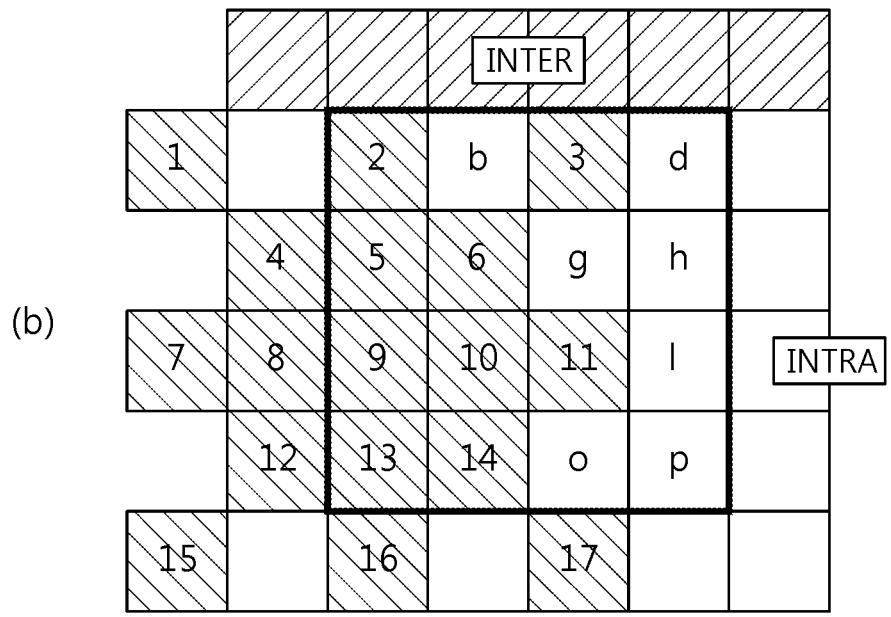
(b)

METHOD FOR ENCODING AND DECODING IMAGES BASED ON CONSTRAINED OFFSET COMPENSATION AND LOOP FILTER, AND APPARATUS THEREFOR

CROSS-REFERENCE TO RELATED APPLICATION(S)

This present application is a continuation of U.S. patent application Ser. No. 14/347,709 filed Mar. 27, 2014, which is a National Stage of International Application PCT/KR2012/007833 filed on Sep. 27, 2012, which claims the benefit of Korean Patent Application No. 10-2011-0098601, filed on Sep. 28, 2011, Korean Application No. 10-2012-0019999, filed Feb. 28, 2012, Korean Application No. 10-2012-0039412, filed Apr. 16, 2012 and Korean Application No. 10-2012-0107639 filed Sep. 27, 2012 in the Korean Intellectual Property Office, the entire disclosures of which are incorporated herein by reference for all purposes.

DESCRIPTION

1. Technical Field

The present invention relates to digital video, and more particularly, to a method and an apparatus for encoding and decoding video based on constrained offset compensation and filtering.

2. Background Art

Recently, with the expansion of broadcasting services supporting high definition (HD) resolution in the country and around the world, many users have been accustomed to a high resolution and definition video, such that many organizations have conducted many attempts to develop next-generation video devices. In addition, the interest in HDTV and ultra high definition (UHD) having a resolution four times higher than that of HDTV have increased and thus, a compression technology for higher-resolution and higher-definition video have been required.

Examples of the video compression technology may include an inter prediction technology predicting sample values included in a current picture from a picture before and/or after the current picture, an intra prediction technology predicting sample values included in the current picture using sample information in the current picture, a weight prediction technology for preventing deterioration of image quality due to a change in illumination, and the like, an entropy encoding technology allocating a short code to symbols having a high appearance frequency and a long code to symbols having a low appearance frequency, and the like. In particular, when the prediction for the current block is performed in a skip mode, the predicted block is generated by using only predicted values from a previously encoded region and separate motion information or a residual signal is not transmitted from an encoder to a decoder. Video data may be effectively compressed by the video compression technologies.

In order to minimize a difference between an original video and a reconstructed video at the time of encoding and decoding video, offset compensation or a loop filter may be applied. In the case of the offset compensation, and distortion from the original video can be minimized by calculating errors of sample values between the original video and the reconstructed video to obtain offsets and by applying the obtained offsets to the reconstructed video. In the case of the loop filter, the distortion from the original video can be minimized by deriving filter coefficients based on a Wiener filter minimizing errors between the original video and the reconstructed video and then, applying the derived filter coefficients to the reconstructed video.

Meanwhile, the compressed video bit streams may be transmitted through a network channel in which errors easily occur. However, when errors occur in the compressed video bit streams, the offset compensation or the loop filter according to the related art do not have the countermeasures therefore and therefore, the errors may be temporally or spatially propagated by the offset compensation or the loop filter. Therefore, the offset compensation or the loop filter according to the related art may largely degrade the image quality of the reconstructed video and the compressed video bit streams cannot be decoded.

Therefore, there is a need to apply the error-resilient offset compensation or loop filter.

SUMMARY OF INVENTION

Technical Problem

The present invention provides a method and an apparatus for encoding and decoding video based on constrained offset compensation and filtering. In addition, the present invention provides a method for constraining an application of offset compensation or a loop filter at the time of encoding and decoding video by using encoding parameters of at least one of a target block of a sample adaptive offset compensation or loop filter and neighboring blocks of the target block.

Technical Solution

In an aspect, a method for decoding a video is provided. The method includes receiving a constrained offset compensation indicator indicating whether at least one of a sequence, a picture, a frame, a slice, a coding unit (CU), a prediction unit (PU), and a transform unit (TU) supports constrained offset compensation from an encoder, receiving a sample adaptive offset (SAO) compensation indicator indicating whether sample adaptive offset compensation is performed or not from the encoder, receiving an SAO parameter from the encoder, and performing the sample adaptive offset compensation on a sample of a reconstructed video based on the SAO compensation indicator and the SAO parameter.

In another aspect, a method for encoding a video is provided. The method includes transmitting a constrained offset compensation indicator indicating whether at least one of a sequence, a picture, a frame, a slice, a coding unit (CU), a prediction unit (PU), and a transform unit (TU) supports constrained offset compensation to a decoder, transmitting a sample adaptive offset (SAO) compensation indicator indicating whether SAO compensation is performed or not to the decoder, transmitting an SAO parameter to the decoder, and performing the sample adaptive offset compensation on a sample of a reconstructed video based on the SAO compensation indicator and the SAO parameter.

In another aspect, a method for encoding a video is provided. The method includes transmitting a constrained loop filter indicator indicating whether at least one of a sequence, a picture, a frame, a slice, a coding unit (CU), a prediction unit (PU), and a transform unit (TU) supports application of a constrained loop filter to a decoder, transmitting an adaptive loop filter (ALF) application indicator indicating whether the ALF is applied or not to the decoder, transmitting the ALF parameter to the decoder, and applying the ALF to a sample of a reconstructed video based on the ALF application indicator and the ALF parameter.

Advantageous Effects

The exemplary embodiments of the present invention can apply the offset compensation or loop filter so as to withstand errors at the time of encoding and decoding video.

DESCRIPTION OF DRAWINGS

FIG. 9 shows a case in which a filter is classified based on a BA method by using encoding parameters in the proposed video encoding method according to an embodiment of the present invention.

FIG. 10 shows an example of a case in which an ALF is applied using the encoding parameters in the proposed video encoding method according to an embodiment of the present invention.

MODE FOR INVENTION

Hereinafter, exemplary embodiments of the present invention will be described in detail with reference to the accompanying drawings. Further, in describing exemplary embodiments of the present invention, well-known functions or constructions will not be described in detail since they may unnecessarily obscure the understanding of the present invention.

It is to be understood that when any element is referred to as being "connected to" or "coupled to" another element, it may be connected directly to or coupled directly to another element or be connected to or coupled to another element, having the other element intervening therebetween. Further, in the present specification, in the case of describing "including" a specific component, it is to be understood that additional components other than a corresponding component are not excluded, but may be included in exemplary embodiments or the technical scope of the present invention.

Terms used in the specification, 'first', 'second', etc., may be used to describe various components, but the components are not to be construed as being limited to the terms. That is, the terms are used to distinguish one component from another component. Therefore, the first component may be referred to as the second component, and the second component may be referred to as the first component.

In addition, components described in exemplary embodiments of the present invention are independently shown only in order to indicate that they perform different characteristic functions. Therefore, the components that are independently shown do not mean that each of the components may not be implemented as one hardware or software. That is, each of the components is divided for convenience of explanation, a plurality of components may be combined with each other to thereby be operated as one component or one component may be divided into a plurality components to thereby be operated as the plurality of components, which are included in the scope of the present invention as long as it departs from essential characteristics of the present invention.

In addition, some of components may not be indispensable components performing essential functions of the present invention, but be selective components improving only performance thereof. The present invention may also be implemented only by a structure including the indispensible components except for the selective components, and the structure including only the indispensible components is also included in the scope of the present invention.

Figure 1:
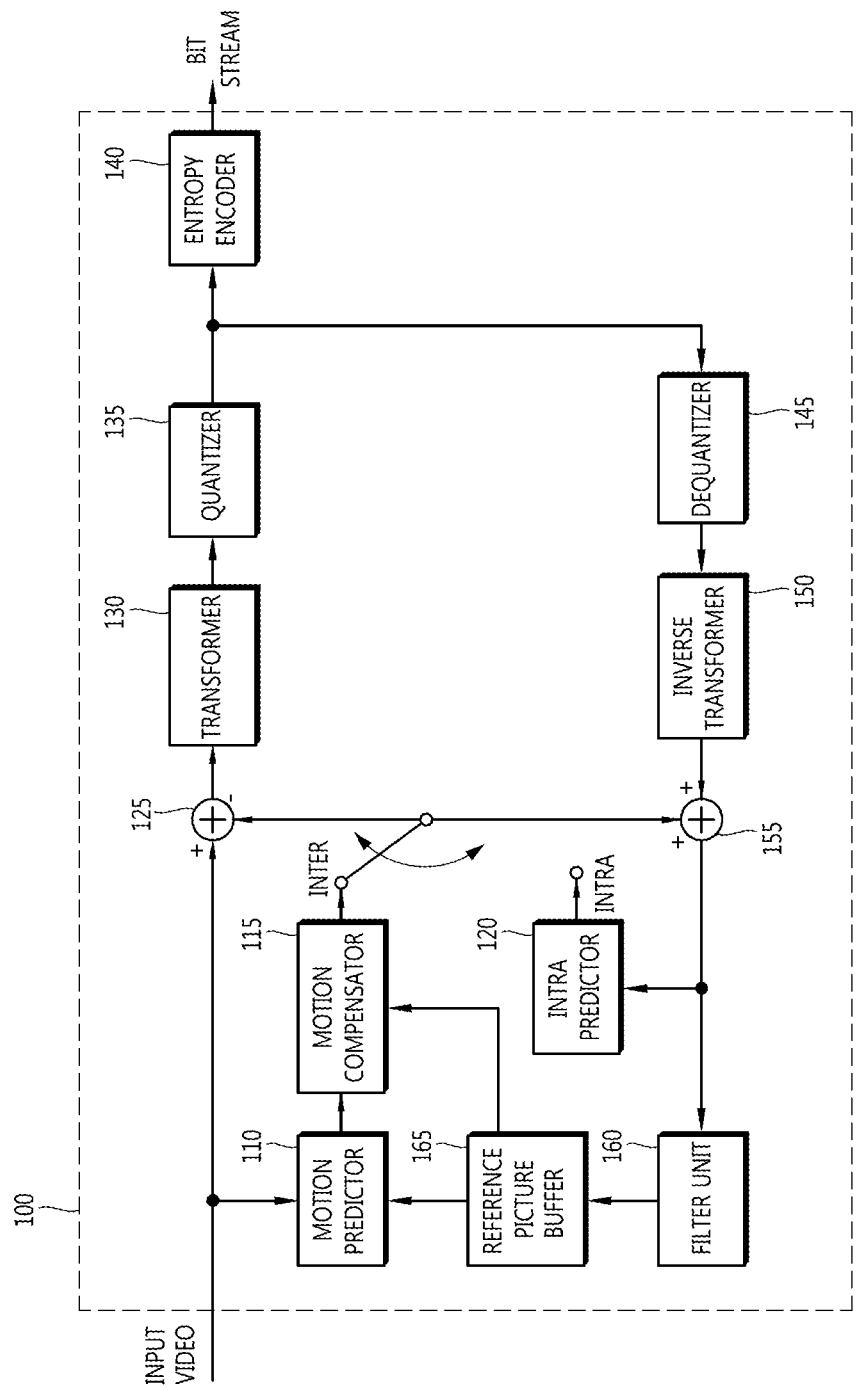
FIG. 1 is a block diagram of a video encoding apparatus according to an embodiment of the present invention.

FIG. 1 is a block diagram of a video encoding apparatus according to an embodiment of the present invention.

Referring to FIG. 1, a video encoding apparatus 100 includes a motion predictor 110, a motion compensator 115, an intra predictor 120, a subtractor 125, a transformer 130, a quantizer 135, an entropy encoder 140, a dequantizer 145, an inverse transformer 150, an adder 155, a filter unit 160, and a reference picture buffer 165.

The video encoding apparatus 100 may encode the input video with an intra mode or an inter mode and output bit stream. In the case of the intra mode, the prediction may be performed in the intra predictor 120 and in the case of the inter mode, the prediction may be performed in the motion predictor 110, the motion compensator 115, and the like. The video encoding apparatus 100 may generate a predicted block for an input block of the input video and then, encode a difference between the input block and the predicted block.

In the intra mode, the intra predictor 120 uses sample values of the already encoded block around a current block to perform spatial prediction, thereby generating the predicted block.

In the case of the inter mode, the motion predictor 110 may obtain a motion vector by finding out a region which is best matched with the input block in a reference picture stored in the reference picture buffer 165 during a motion prediction process. The motion compensator 115 uses the motion vector and the reference picture that is stored in the reference picture buffer 165 to perform the motion compensation, thereby generating the predicted block.

The subtractor 125 may generate a residual block due to a difference between the input block and the generated predicted block. The transformer 130 may perform transform on the residual block to output transform coefficients. The residual signal may mean a difference between an original signal and a predicted signal. In addition, the residual signal may mean a signal in a transformed form of a difference between the original signal and the predicted signal or may mean a signal in a transformed and quantized form of a difference between the original signal and the predicted signal. The residual signal may be referred to as a residual block in a block unit.

The quantizer 135 quantizes the transform coefficients on the basis of quantization parameters to output the quantized coefficients.

The entropy encoder 140 performs entropy encoding on symbols corresponding to values calculated in the quantizer 135 or encoding parameter values calculated during the encoding process according to probability distribution, thereby outputting the bit streams.

When the entropy encoding is applied, compression performance of the video encoding may be increased by allocating a smaller number of bits to symbols having high generation probability and a larger number of bits to symbols having low generation probability.

For the entropy encoding, encoding methods, such as context-adaptive variable length coding (CAVLC), context-adaptive binary arithmetic coding (CABAC), and the like, may be used. For example, the entropy encoder 140 may use a variable length coding/code (VLC) table to perform the entropy encoding. The entropy encoder 145 may also perform the entropy encoding by deriving a probability model of a binarization method of a target symbol and a target symbol/bin and then, using the derived binarization method or the probability model.

The quantized coefficients may be dequantized in the dequantizer 145 and inversely transformed in the inverse transformer 150. The adder 155 may generate a reconstructed block using the predicted block and the inversely transformed quantized coefficients.

The filter unit 160 may apply at least one of a deblocking filter, a sample adaptive offset (SAO), an adaptive loop filter (ALF) to the reconstructed block or a reconstructed picture. The reconstructed block passing through the filter unit 160 may be stored in the reference picture buffer 165.

Figure 2:
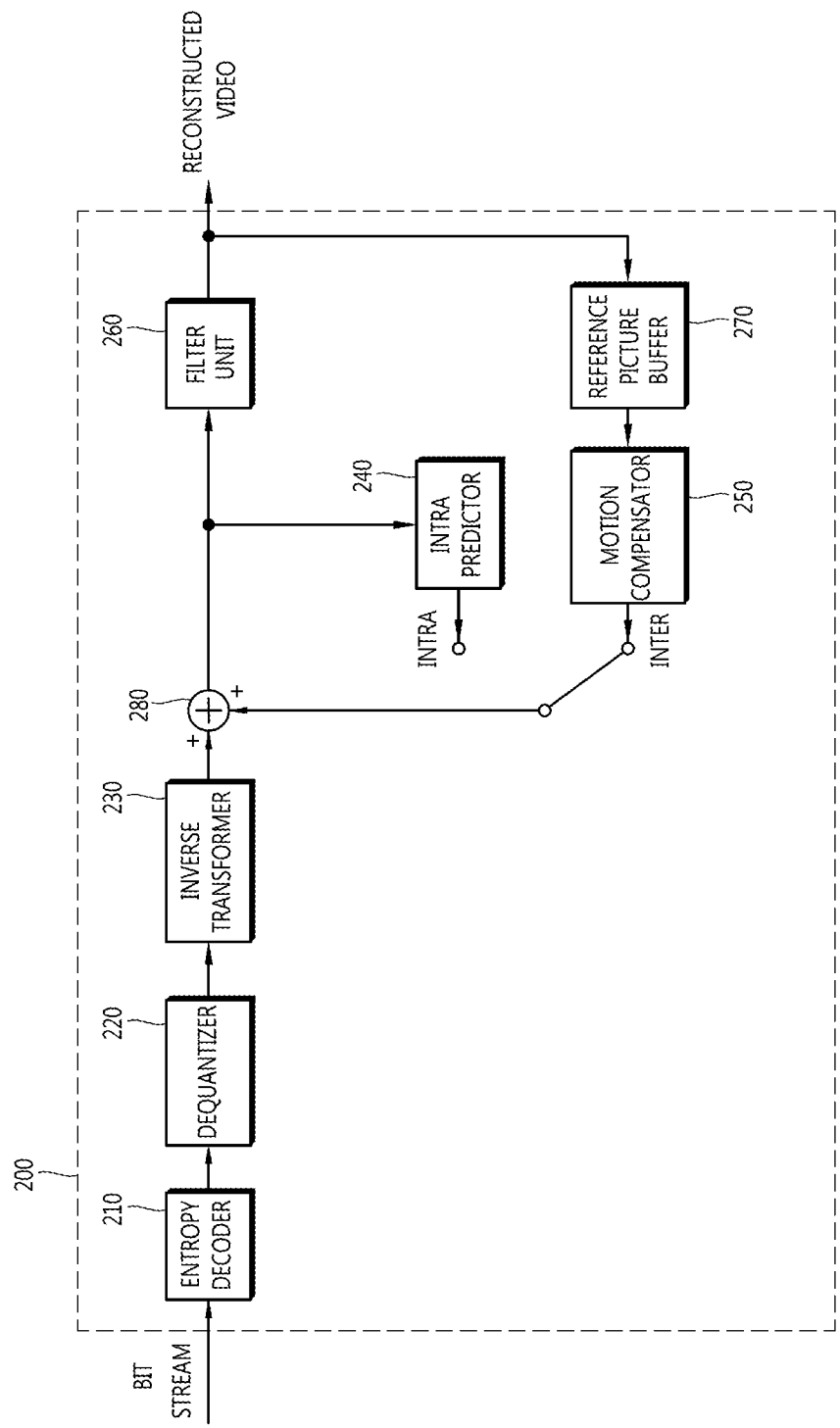
FIG. 2 is a block diagram of a video decoding apparatus according to an embodiment of the present invention.

FIG. 2 is a block diagram of a video decoding apparatus according to an embodiment of the present invention.

Referring to FIG. 2, a video decoding apparatus 200 includes an entropy decoder 210, a dequantizer 220, an inverse transformer 230, an intra predictor 240, a motion compensator 250, a filter unit 260, a reference picture buffer 270, and an adder 280.

The video decoding apparatus 200 may receive bit streams output from the encoder to perform the decoding with the intra mode or the inter mode and output the reconstructed video, that is, the recovered video. In the case of the intra mode, the prediction may be performed in the intra predictor 240 and in the case of the inter mode, the prediction may be performed in the motion compensator 250. The video decoding apparatus 200 may obtain the residual block reconstructed from the received bit streams and generate the predicted block and then, add the reconstructed residual block to the predicted block to generate the reconstructed block, that is, the recovered block.

The entropy decoder 210 may perform the entropy encoding on the input bit streams according to the probability distribution to generate the symbols in the quantized coefficient type. The entropy decoding method may be performed corresponding to the above-mentioned entropy encoding method.

The quantized coefficient may be dequantized in the dequantizer 220 and is inversely transformed in the inverse transformer 230 and dequantized/inversely transformed to generate the residual block.

In the case of the intra mode, the intra predictor 240 uses sample values of the already encoded block around a current block to perform spatial prediction, thereby generating the predicted block. In the case of the inter mode, the motion compensator 250 uses a motion vector and the reference picture that is stored in the reference picture buffer 270 to perform the motion compensation, thereby generating the predicted block.

The adder 280 may generate the reconstructed block based on the residual block and the predicted block. The filter unit 260 may apply at least one of the deblocking filter, the SAO, and the ALF to the reconstructed block. The filter unit 260 outputs the reconstructed video, that is, the recovered video. The reconstructed video may be stored in the reference picture buffer 270 so as to be used for the inter prediction.

Constrained intra prediction (CIP) is a technology for improving robustness to errors at the time of video encoding or video decoding. The CIP technology does not use neighboring reconstructed sample regions when the reconstructed sample regions around a prediction target block used at the time of the intra prediction are inter-encoded and generates a reference sample by interpolation or extrapolation using the neighboring reconstructed samples when the reconstructed sample regions around the prediction target block are intra-encoded. The intra prediction may be performed based on the generated reference samples. Therefore, even when pictures referenced by the neighboring inter-encoded blocks are lost, the prediction target block may not be affected. However, during the deblocking filtering process according to the related art, the reconstructed video is subjected to filtering at all times regardless of whether the constrained intra prediction is applied or the encoding parameters and therefore, errors within the reconstructed video may be propagated to a region in which errors do not occur. For example, the errors occurring in the inter-encoded block may be propagated to the intra-encoded block. Therefore, the deblocking filtering process according to the related art has a problem in that a subjective quality of image of the reconstructed video may be greatly degraded.

In order to solve the above problem, a method of transmitting a flag indicating whether a constrained sample adaptive offset (SAO) compensation or a constrained adaptive loop filter (ALF) is applied may be proposed. If it is determined that the sample adaptive offset compensation or the adaptive loop filter is constrainedly applied according to the transmitted flag, the sample adaptive offset compensation or the ALF may be constrainedly applied according to the encoding parameters of the current block and the neighboring blocks. Therefore, even in the case in which the inter-encoded block cannot be normally reconstructed, the intra-encoded block can be normally decoded. That is, it is possible to prevent the error of the inter-encoded block from being propagated to the intra-encoded block and the reconstructed results of the intra-encoded block may be maintained in the encoder and the decoder.

Hereinafter, the video encoding and decoding method proposed according to an embodiment of the present invention will be described. First, the video encoding and decoding method based on the constrained sample adaptive offset compensation will be described. The sample adaptive offset compensation may be included in an in-loop filtering, and the in-loop filtering may additionally include a deblocking filter besides the sample adaptive offset compensation.

Figure 3:
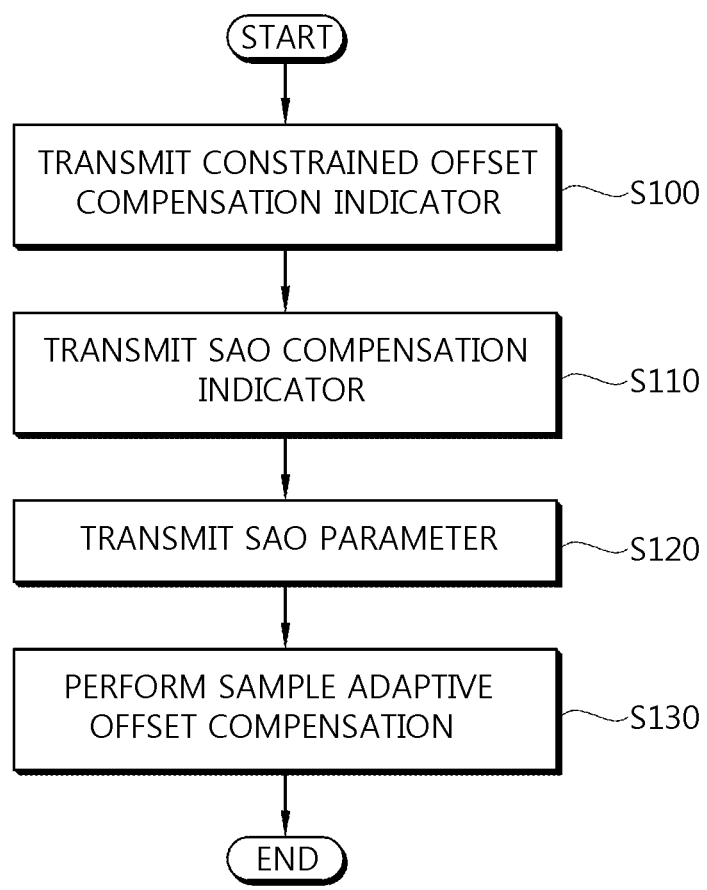
FIG. 3 shows an example of a proposed video encoding method according to an embodiment of the present invention.

FIG. 3 shows an example of a proposed video encoding method according to an embodiment of the present invention.

In S100, the encoder transmits constrained offset compensation indicator to a decoder. In S110, the encoder transmits an SAO compensation indicator indicating whether the sample adaptive offset compensation is performed or not to the decoder. In S120, the encoder transmits the SAO parameter to the decoder. In S130, the encoder performs the sample adaptive offset compensation on the reconstructed video based on the SAO compensation indicator and the SAO parameter.

The constrained offset compensation indicator transmitted in S100 will be described.

The decoder may determine whether at least one of an encoding target sequence, a picture, a frame, a field, a slice, a coding unit (CU), a prediction unit (PU), and a transform unit (TU) supports the constrained offset compensation by the constrained offset compensation indicator transmitted from the encoder.

The encoder may transmit the constrained offset compensation indicator padded into the bit streams to the decoder. The constrained offset compensation indicator may be padded into the bit streams by the entropy coding process such as arithmetic coding, variable length coding (VLC), and the like. The constrained offset compensator indicator may be transmitted using a sequence parameter set (SPS), a picture parameter set (PPS), an adaptation parameter set (APS), a slice header, and the like, within the bit stream. The decoder may parse the bit streams by the entropy decoding process to obtain the constrained offset compensation indicator transmitted.

Table 1 shows an example of the constrained offset compensation indicator padded into the bit stream. In Table 1, the offset compensation indicator is padded into the sequence parameter set.

TABLE 1

| seq_parameter_set_rbsp( ) { | Descriptor |
|---|---|
| ... | |
| seq_parameter_set_id | ue(v) |
| pic_width_in_luma_samples | u(16) |
| pic_height_in_luma_samples | u(16) |
| constrained_intra_pred_flag | u(1) |
| constrained_offset_flag | u(1) |
| ... | |
| } | |

In Table 1, constrained_offset_flag represents the constrained offset compensation indicator. When a value of constrained_offset_flag is 0, it may indicate that the constrained offset compensation is not supported and when a value of constrained_offset_flag is 1, it may indicate that the constrained offset compensation is supported. Alternatively, when the value of the constrained_intra_pred_flag that is a parameter for error-resilient intra prediction is 1, it may indicate that the constrained offset compensation is supported without padding the separate offset compensation indicator.

Table 2 shows another example of the constrained offset compensation indicator padded into the bit stream. In Table 2, the constrained offset compensation indicator is padded into a picture parameter set.

TABLE 2

| pic_parameter_set_rbsp( ) { | Descriptor |
|---|---|
| ... | |
| pic_parameter_set_id | ue(v) |
| seq_parameter_set_id | ue(v) |
| constrained_offset_flag | u(1) |
| ... | |
| } | |

In Table 2, constrained_offset_flag represents the constrained offset compensation indicator. When the value of constrained_offset_flag is 0, it may indicate that the constrained offset compensation is not supported and when the value of constrained_offset_flag is 1, it may indicate that the constrained offset compensation is supported.

Table 3 shows another example of the constrained offset compensation indicator padded into the bit stream. In Table 3, the constrained offset compensation indicator is padded into a picture parameter set.

TABLE 3

| pic_parameter_set_rbsp( ) { | Descriptor |
|---|---|
| ... | |
| pic_parameter_set_id | ue(v) |
| seq_parameter_set_id | ue(v) |
| loop_filter_across_tiles_enabled_flag | u(1) |
| loop_filter_across_slices_enabled_flag | u(1) |
| ... | |
| } | |

In Table 3, loop_filter_across_tiles_enabled_flag or loop_filter_across_slices_enabled_flag represents the constrained offset compensation indicator. When the value of loop_filter_across_tiles_enabled_flag is 0, it may indicate that the constrained offset compensation is supported. Or, when the value of loop_filter_across_slices_enabled_flag is 0, it may indicate that the constrained offset compensation is supported.

Alternatively, it may support the constrained offset compensation at all times in the encoder and the decoder without padding the separate offset compensation indicator.

Meanwhile, when the constrained offset compensation indicator is set to be 1 and thus, the encoder performs the constrained offset compensation, the encoder may use the encoding parameters. The encoding parameters include at least one of a coding mode indicating whether intra encoding is performed or inter encoding is performed, an intra prediction mode, an inter prediction mode, a coded block flag (CBF), a quantization parameter, a motion vector, a motion vector predictor, a reference picture index, and a slice/tile boundary or not.

For example, if the encoding parameters may include a tile boundary, and the value of the constrained offset compensation indicator is 0, the offset compensation may be constrained by not applying the offset compensation beyond the tile boundary. In this case, the constrained offset compensation indicator may be loop_filter_across_tiles_enabled_flag in Table 3. The tile boundary may be determined based on an identifier of the tile. Or, the encoding parameters may include a slice boundary, and if the value of the constrained offset compensation indicator is 0, the offset compensation may be constrained by not applying the offset compensation beyond the slice boundary. In this case, the constrained offset compensation indicator may be loop_filter_across_slices_enabled_flag in Table 3. The slice boundary may be determined based on an identifier of the slice.

For example, it may be determined whether an applied target block of the constrained offset compensation or neighboring blocks of the target block are intra-encoded or inter-encoded by using the encoding parameters. In this case, when any one of the blocks is intra-encoded, the corresponding block may be considered as being encoded with the intra mode and when any one of the blocks is inter-encoded, the corresponding block may be considered as being encoded with the inter mode. For example, when the block is encoded with pulse coded modulation (PCM), the corresponding block may be determined as being intra-encoded.

When the encoder performs the constrained offset compensation by using the encoding parameters, reliability is determined according to the encoding parameters and the determined reliability may be applied at the time of performing the constrained offset compensation. For example, as shown in Table 4, the reliability may be determined according to each encoding parameter and the reliability may also be determined according to a combination of at least one encoding parameter.

TABLE 4

| Encoding Parameter | Strong Reliability | Weak Reliability |
|---|---|---|
| Encoding Mode | Inter | Inter |
| Encoding Block Flag | CBF ≠ 0 | CBF = 0 |
| Quantization Parameter | QP < Specific QP | QP > Specific QP |
| Inter Mode | No Skip Mode | Skip Mode |
| Slice/tile Boundary | In Boundary | Out of Boundary |

Referring to Table 4, the intra-encoded block is predicted within the current slice and therefore, may be determined as having the strong reliability and the inter-encoded block is predicted by the previous slice and therefore, may be determined as having the weak reliability. n addition, when CBF=0 or the inter mode is a skip mode, no residual signal is and therefore, it may be determined that the distortion becomes large and the reliability is weak, as compared with another block. n addition, it may be determined that the block within the slice/tile boundary has the strong reliability and the block out of the boundary has the weak reliability. If the value of the constrained offset compensation indicator in Table 3 (i.e., loop_filter_across_tiles_enabled_flag or loop_filter_across_slices_enabled_flag) is 0, "out of boundary" which has weak reliability may not be allowed.

When the constrained offset compensation is performed, in particular, the sample adaptive offset compensation may be performed. The encoder obtains the offsets by calculating errors of the sample values between the original video and the reconstructed video and applies the obtained offsets to the reconstructed video to minimize the distortion from the original video, thereby improving the performance.

The SAO compensation indicator transmitted in S110 may be transmitted, with being included in the sequence parameter set, the picture parameter set, the adaptive parameter set, the slice header, and the like. The SAO compensation indicator may be sample_adaptive_offset_enabled_flag. In addition, it is possible to implement signaling by including whether the sample adaptive offset compensation is performed on luma component and chroma component in each bit stream.

The SAO parameter transmitted in S120 will be described.

The SAO parameter may include at least one of an offset compensation block structure, a quadtree depth, offset types, offset categories, and offset values. The SAO parameter may include the offset compensation block structure within the bit stream. The offset compensation block structure within the SAO parameter may be sao_split_flag. In this case, the information regarding the offset compensation block structure may be signaled by splitting one slice into a quadtree. In addition, the information regarding the depth split into the quadtree may also be included in the bit streams and the minimum unit of the split region may be a largest coding unit (LCU).

Alternatively, the SAO parameter may include the offset types, the offset categories, the offset signs and the offset values. Table 5 shows the offset types and thus, the number of offset categories in response thereto in the sample adaptive offset compensation.

TABLE 5

| Offset Type Index | Offset Type | | The Number of Offset Categories |
|---|---|---|---|
| 0 | | No Offset Performance | 0 |
| 1 | Edge Offset | One-dimensional 0° type edge offset | 4 |
| 2 | | One-dimensional 90° type edge offset | 4 |
| 3 | | One-dimensional 135° type edge offset | 4 |
| 4 | | One-dimensional 45° type edge offset | 4 |
| 5 | Band Offset | Central band offset | 16 |
| 6 | | Side band offset | 16 |

Referring to Table 5, the number of offset types may be 7 in total. However, it is not limited thereto, and the number of offset types may be various. Each offset type may have offset values different from different numbers. The edge offset (EO) may be classified into four offset types according to an angle. In the edge offset, each offset type may have four offset categories by conditions. In the edge offset, the offset categories and the offset signs may be determined by comparing the offset compensation target samples with the neighboring samples. That is, in case of the edge offset, the decoder may determine the offset categories and the offset signs without additional signaling. The band offset (BO) may be classified into two offset types according to the position of the band, each of which may have 16 offset categories. In the band offset, the offset categories may be determined by dividing a range of sample values that may be included in the offset compensation target samples into 16 sections and then, may be determined according to which of the divided sections the sample values correspond to. The offset type index is encoded according to the determined offset type and may be signaled to the decoder and the offset categories and the offset signs may each be classified in the encoder and the decoder according to conditions without signaling. The determined offset categories and the offset signs may each correspond to the parsed offset values. When the offset type is determined as the edge offset, four offset values may be signaled to the decoder and when the offset type is determined as the band offset, 16 offset values may be signaled to the decoder.

Meanwhile, the SAO parameter may be determined based on the encoding parameters of at least one of the target block of the sample adaptive offset compensation and the neighboring blocks of the target block. For example, upon determining the offset categories in the edge offset type, the encoding parameters of at least one of the target block of the sample adaptive offset compensation and the neighboring blocks can be used. For example, the encoding parameters may include the tile boundary, and the tile boundary may be determined based on the identifier of the tile. Or, the encoding parameters may include the slice boundary, and the slice boundary may be determined based on the identifier of the slice.

Figure 4:
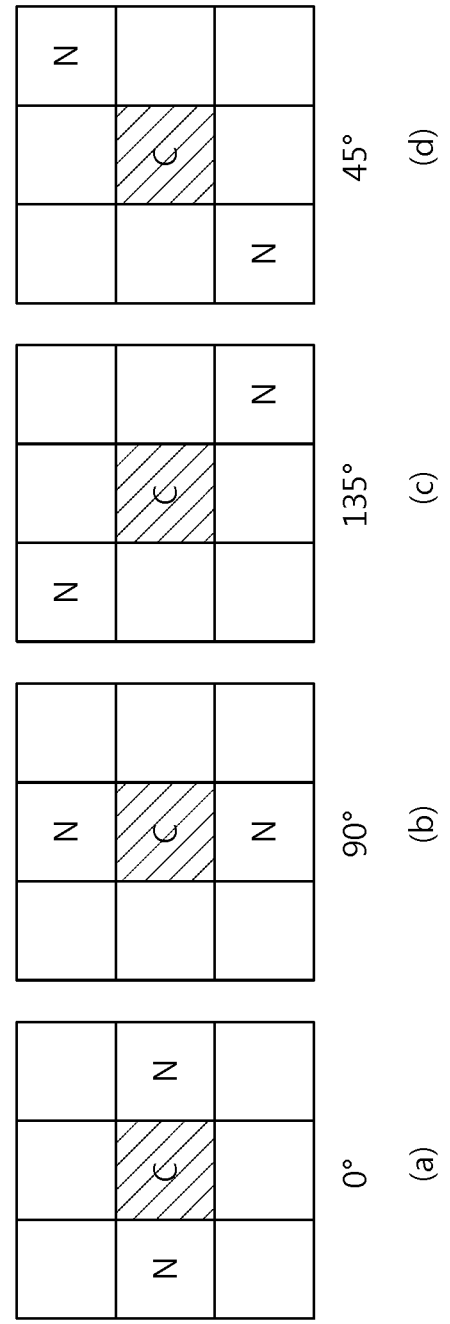
FIG. 4 shows a type of an edge offset determined according to an angle.

FIG. 4 shows a type of an edge offset determined according to an angle. The edge offset may be classified into four offset types according to an angle. In FIG. 4, C represents the target samples of the sample adaptive offset compensation and N represents the neighboring samples.

Figure 5:
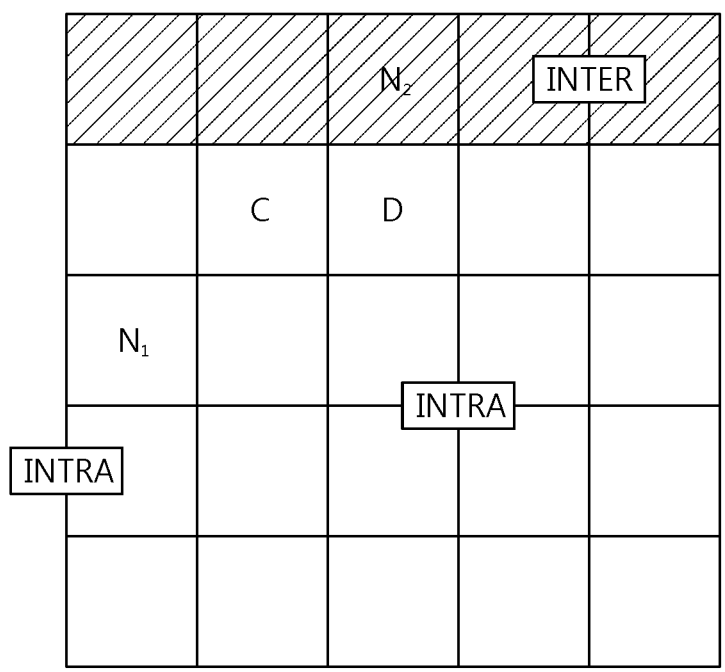
FIG. 5 shows an example of a diagram showing a case in which the offset categories and the offset signs are determined in a type of an edge offset by using encoding parameters according to an embodiment of the present invention.

FIG. 5 shows an example of a diagram showing a case in which the offset categories and the offset signs are determined in a type of an edge offset by using encoding parameters according to an embodiment of the present invention.

Referring to FIG. 5, the target block of the sample adaptive offset compensation and a left block are intra-encoded and the target block and an upper block are inter-encoded. That is, in FIG. 5, C and $N_1$ become an intra block sample and $N_2$ becomes an inter block sample. Table 6 shows conditions in which the offset categories are determined and N may be $N_1$ or $N_2$. If the offset category is determined to 1 or 2, the offset sign may be a positive number. If the offset category is determined to 3 or 4, the offset sign may be a negative number.

TABLE 6

| Offset Category | Conditions |
|---|---|
| 1 | C is smaller than two Ns |
| 2 | C is smaller than one N and is equal to another N |
| 3 | C is larger than one N and is equal to another N |
| 4 | C is larger than two Ns |
| 0 | No applicable to the above conditions |

It is assumed that the target samples of the sample adaptive offset compensation are included in the intra-encoded block and errors occur in the samples of the inter-encoded neighboring blocks. In this case, upon determining the offset categories, the offset categories may be determined only by using the intra-encoded samples within the target block without using the samples of the inter-encoded block among the neighboring blocks. This is to prevent errors from being propagated to the samples of the intra-encoded block. Alternatively, upon determining the offset categories, the offset categories may be determined by substituting the inter-encoded samples into the samples of the intra-encoded block without using the samples of the inter-encoded block among the neighboring blocks. For example, in FIG. 5, the offset categories may be determined by substituting a sample value of $N_2$ into a sample value of D. Alternatively, the offset categories may not be determined.

The encoder can reconstruct the offset compensated sample values by adding the calculated offset values to the sample values, based on the SAO compensation indicator and the SAO parameter. The decoder may perform the sample adaptive offset compensation by decoding each offset value and then, using the offset values corresponding to the offset categories classified by conditions for each sample within each block.

The sample adaptive offset compensation may be performed based on the encoding parameters of at least one of the target block of the sample adaptive offset compensation or the neighboring blocks of the target block. The encoding parameters may include the tile boundary, and the sample adaptive offset compensation may be performed based on the tile boundary. For example, the sample adaptive offset compensation may not be performed beyond the time boundary. Or, the encoding parameters may include the slice boundary, and the sample adaptive offset compensation may be performed based on the slice boundary. For example, the sample adaptive offset compensation may not be performed beyond the slice boundary.

Or, provided that the target samples of the sample adaptive offset compensation are included in the intra-encoded block and errors occur in the samples of the inter-encoded neighboring blocks, the sample adaptive offset compensation may be performed only by using the intra-encoded samples within the target block without using the samples of the inter-encoded block among the neighboring blocks. This is to prevent errors from being propagated to the samples of the intra-encoded block. Alternatively, upon determining the offset categories, the sample adaptive offset compensation may be performed by substituting the samples of the inter-encoded block into the samples of the intra-encoded block without using the samples of the inter-encoded block among the neighboring blocks. Alternatively, the sample adaptive offset compensation may not be performed.

Describing the above processes, the encoder may split one slice into a size of various blocks having the quadtree structure, determine the optimal type using rate-distortion optimization (RDO) among the edge offset or the band offset for each block, and determine the offset types and the offset values for the determined optimal types. As described above, the SAO parameter may be entropy-encoded and then, transmitted to the decoder.

The video encoding method based on the constrained offset compensation described above may be applied to the video decoding method as it is. That is, the decoder receives and parses the constrained offset compensation indicator, the SAO compensation indicator, the SAO parameter, and the like, that are transmitted from the encoder and performs the sample adaptive offset compensation based thereon.

Figure 6:
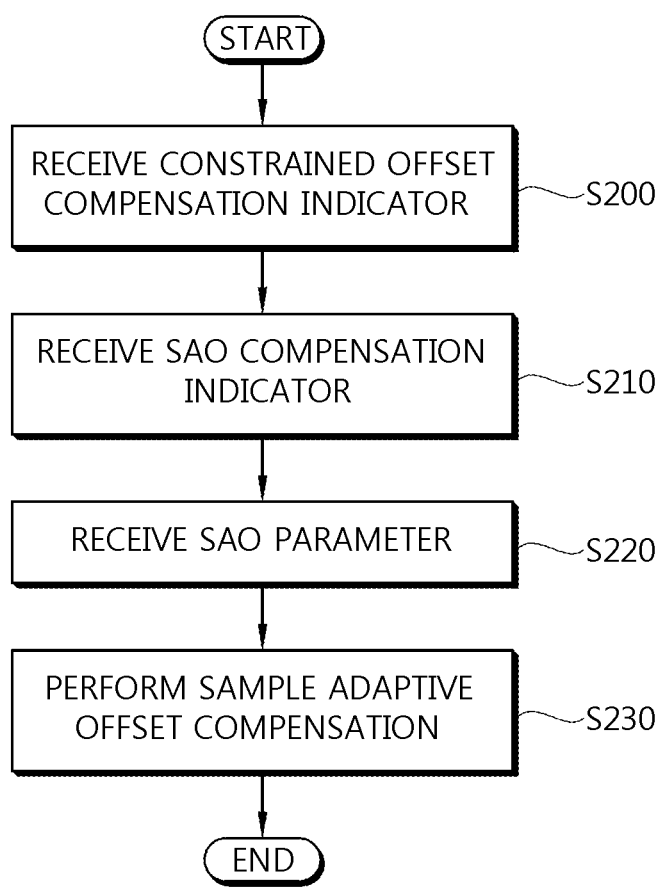
FIG. 6 shows an example of a proposed video decoding method according to an embodiment of the present invention.

FIG. 6 shows an example of a proposed video decoding method according to an embodiment of the present invention.

In S200, the decoder receives the constrained offset compensation indicator from the encoder. Table 7 shows an example of the constrained offset compensation indicator padded into the picture sets.

TABLE 7

| | Descriptor |
|---|---|
| pic_parameter_set_rbsp( ) { | |
| pic_parameter_set_id | ue(v) |
| seq_parameter_set_id | ue(v) |
| .... | |
| constrained_intra_pred_flag | u(1) |
| if (constrained_intra_pred_flag) | |
| constrained_in_loop_filter_flag | u(1) |
| .... | |

In the above Table 7, when a value of constrained_intra_pred_flag is 1, that is, when the constrained intra prediction is performed, the decoder may parse constrained_in_loop_filter_flag to determine whether a constrained in-loop filter is applied. When a value of constrained_in_loop_filter_flag is 1, it may indicate that the constrained in-loop filter is applied and when the value of constrained_in_loop_filter_flag is 0, it may indicate that the constrained in-loop filter is not applied. The applied target of the constrained in-loop filter may be at least one of the deblocking filter, the offset compensation, and the ALF.

In S210, the decoder receives the SAO compensation indicator indicating whether the SAO compensation is performed or not from the encoder. The decoder may parse the SAO compensation indicator sample_adaptive_offset_enabled_flag transmitted while being included in the sequence parameter set, the picture parameter set, the adaptive parameter set, the slice header, and the like, within the bit streams to determine whether the SAO compensation is performed. In addition, the decoder may parse the information determining whether luma component and chroma component each are subjected to the SAO compensation.

In S220, the decoder receives the SAO parameter from the encoder. The decoder may parse the SAO parameter transmitted from the encoder. For example, when the SAO parameter includes sao_split_flag that is the information regarding the offset compensation block structure within the bit streams, the decoder may parse the information to determine the structure of the block performing the sample adaptive offset compensation. In addition, the decoder may also parse the information regarding the depth splitting into the quadtree included in the bit streams.

When the SAO parameter includes offset types and offset categories, the offset types and the offset categories in response thereto may follow Table 5 described above. The number of offset types may be 7 in total. Each offset type may have offset values different from different numbers. When the offset type is determined as the edge offset, the decoder may parse four offset values from the bit streams and when the offset type is determined as the band offset, may parse 16 offset values from the bit streams. In addition, the offset categories according to each offset type may correspond to each parsed offset value. For example, the offset categories and the offset signs in the edge offset may be determined by comparing the offset compensation target samples with the neighboring samples and the offset categories in the band offset may be determined by dividing the range of the sample values included in the offset compensation target samples into 16 sections and then, according to which of the divided sections the sample values correspond to.

Meanwhile, when determining the offset categories according to the offset types, the target sample belongs to the intra encoded block and the neighboring samples belong to the intra encoded block, the offset category for the target sample may not be determined. That is, the value of the offset category may be set to be 0 so as not to perform the offset compensation. For example, a value of constrained_in_loop_filter_flag within the offset compensation indicator may be set to be 1 and when a sample located at (x,y) belongs to the intra-encoded block and at least one sample located at (x+hPos[k],y+vPos[k]) belongs to the inter-encoded block, the value of the offset category may be set to be 0. In this case, hPos[k] and vPos[k] are values representing the positions of the neighboring samples according to the offset types, which may be determined by Table 8. k=0 or 1.

TABLE 8

|  | Type 1 | Type 2 | Type 3 | Type 4 |
|---|---|---|---|---|
| hPos[0] | −1 | 0 | −1 | 1 |
| hPos[1] | 1 | 0 | 1 | −1 |
| vPos[0] | 0 | −1 | −1 | −1 |
| vPos[1] | 0 | 1 | 1 | 1 |

Referring to Table 8, for example, when the offset type is 2, a value of constrained_in_loop_filter_flag within the offset compensation indicator may be set to be 1 and when a sample located at (x,y) belongs to the intra-encoded block and at least one sample located at (x,y+1) or (x,y−1) belongs to the inter-encoded block, the value of the offset category may be set to be '0'.

Meanwhile, when a value of the constrained offset compensation indicator is 1, and a sample located at (x,y) and at least one sample located at (x,hPos[k],y+vPos[k]) belong to different slices/tiles each other, that is, when the at least one sample located at (x,hPos[k],y+vPos[k]) is located outside of the slice/tile to which a sample located at (x,y) belongs, a value of the offset category may be set to 0. In addition, the slice/tile boundary is a boundary of a picture, the outside of the slice/tile boundary may be outside of a picture including no sample.

Meanwhile, the SAO parameter may be determined based on the encoding parameters of at least one of the target block of the sample adaptive offset compensation and the neighboring blocks of the target block.

In S230, the decoder performs the sample adaptive offset compensation based on the SAO compensation indicator and the SAO parameter. The decoder can reconstruct the offset compensated sample values by adding the calculated offset values to the sample values, based on the SAO compensation indicator and the SAO parameter. The sample adaptive offset compensation may be performed based on the encoding parameters of at least one of the target block of the sample adaptive offset compensation or the neighboring blocks of the target block. When the value of the offset type is set to be 0, the target sample may not be subjected to the sample adaptive offset compensation. That is, RecSaoPicture[x,y]=RecPicture[x,y]. The RecSaoPicture[x,y] represents the sample value after the sample located at (x, y) is subjected to the sample adaptive offset compensation and the RecPicture[x,y] represents the reconstructed sample value before the sample adaptive offset compensation is performed.

Hereinafter, the video encoding and decoding method will be described based on the adaptive loop filter (ALF).

Figure 7:
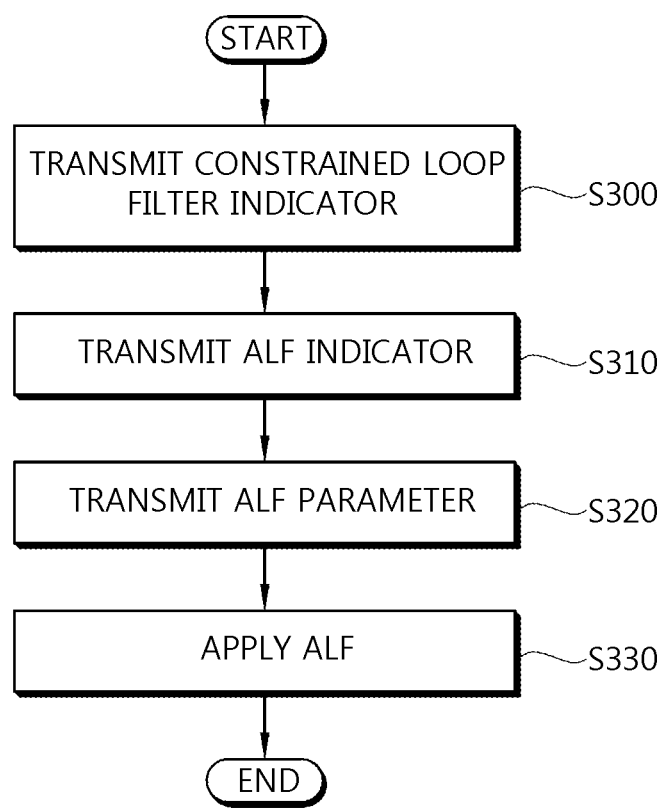
FIG. 7 shows another example of a proposed video encoding method according to an embodiment of the present invention.

FIG. 7 shows another example of a proposed video encoding method according to an embodiment of the present invention.

In S300, the encoder transmits the constrained loop filter indicator to the decoder. In S310, the encoder transmits ALF application indicator indicating whether the ALF is applied or not to the decoder. In S320, the encoder transmits the ALF parameters to the decoder. In S330, the encoder applies the ALF to the video reconstructed based on the ALF application indicator and the ALF parameters.

The constrained loop filter indicator transmitted in S300 will be described.

The decoder may determine whether at least one of the encoding target sequence, the picture, the frame, the field, the slice, the CU, the PU, and the TU applies the constrained loop filter by the constrained loop filter indicator transmitted from the encoder.

The encoder may transmit the constrained loop filter indicator padded into the bit stream to the decoder. The constrained loop filter indicator may be padded into the bit streams by the entropy encoding process such as the arithmetic encoding, the VLC, and the like. The constrained loop filter indicator may be transmitted using the SPS, the PPS, the APS, the slice header, and the like, within the bit streams. The decoder may parse the bit streams by the entropy decoding process to obtain the constrained offset compensation indicator transmitted.

Table 9 shows an example of the constrained loop filter indicator padded into the bit streams. In Table 9, the loop filter indicator is padded into the sequence parameter set.

TABLE 9

| seq_parameter_set_rbsp( ) { | Descriptor |
|---|---|
| ... | |
| seq_parameter_set_id | ue(v) |
| pic_width_in_luma_samples | u(16) |
| pic_height_in_luma_samples | u(16) |
| constrained_intra_pred_flag | u(1) |
| constrained_filter_flag | u(1) |
| ... | |
| } | |

In Table 9, constrained_filter_flag represents the constrained loop filter indicator. When a value of constrained_offset_flag is 0, it may indicate that the constrained loop filter is not applied and when a value of constrained_offset_flag is 1, it may indicate that the constrained loop filter is supported. Alternatively, when the value of the constrained_intra_pred_flag that is a parameter for error-robust intra prediction is 1, it may indicate that the constrained loop filter is applied without padding separate loop filter indicator.

Table 10 shows another example of the constrained loop filter indicator padded into the bit streams. In Table 10, the constrained loop filter indicator is padded into the picture parameter set.

TABLE 10

| pic_parameter_set_rbsp() { | Descriptor |
|---|---|
| ... | |
| pic_parameter_set_id | ue(v) |
| seq_parameter_set_id | ue(v) |
| constrained_fitler_flag | u(1) |
| ... | |
| } | |

In Table 10, constrained_filter_flag represents the constrained loop filter indicator. When a value of constrained_offset_flag is 0, it may indicate that the constrained loop filter is not applied and when a value of constrained_offset_flag is 1, it may indicate that the constrained loop filter is applied.

Or, like Table 3, loop_filter_across_tiles_enabled_flag or loop_filter_across_slices_enabled_flag may represent the constrained loop filter indicator. When the value of loop_filter_across_tiles_enabled_flag is 0, it may indicate that the constrained loop filter is applied. Or, when the value of loop_filter_across_slices_enabled_flag is 0, it may indicate that the constrained loop filter is applied.

Alternatively, it may apply the constrained loop filter at all times in the encoder and the decoder without padding the separate loop filter indicator.

Meanwhile, when the constrained loop filter indicator is set to be 1 and thus, the encoder applies the constrained loop filter, the encoder may use the encoding parameters. The encoding parameters includes at least one of the encoding mode representing whether they are intra-encoded or inter-encoded, the intra prediction mode, the inter prediction mode, the CBF, the quantization parameter, the motion vector, the motion vector predictor, the reference picture index, and the slice/tile boundary.

For example, if the encoding parameters include a tile boundary, the constrained loop filter indicator is loop_filter_across_tiles_enabled_flag in Table 3, and the value of the loop_filter_across_tiles_enabled_flag is 0, the loop filter may be constrained by not applying the loop filter beyond the tile boundary. In this case, the tile boundary may be determined based on an identifier of the tile. Or, if the encoding parameters include a slice boundary, the constrained loop filter indicator is loop_filter_across_slices_enabled_flag in Table 3, and the value of loop_filter_across_slices_enabled_flag is 0, the loop filter may be constrained by not applying the loop filter beyond the slice boundary. In this case, the slice boundary may be determined based on an identifier of the slice.

For example, it may be determined whether an applied target block of the constrained loop filter or neighboring blocks of the target block are intra-encoded or inter-encoded by using the encoding parameters. In this case, when any one of the blocks is intra-encoded, the corresponding block may be considered as being encoded with the intra mode and when any one of the blocks is inter-encoded, the corresponding block may be considered as being encoded with the inter mode. In addition, for example, when the block is encoded with pulse coded modulation (PCM) mode, the corresponding block may be determined as being intra-encoded.

When the encoder applies the constrained loop filter by using the encoding parameters, the reliability is determined according to the encoding parameters and the determined reliability may be applied at the time of performing the constrained offset compensation. For example, as shown in Table 4, the reliability may be determined according to each encoding parameter and the reliability may also be determined according to a combination of at least one encoding parameter. If the value of the constrained offset compensation indicator in Table 3 (i.e., loop_filter_across_tiles_enabled_flag or loop_filter_across_slices_enabled_flag) is 0, "out of boundary" which has weak reliability may not be allowed.

When the constrained loop filter is applied, in particular, the ALF may be applied. The encoder can minimize the distortion from the original video by deriving the filter coefficients based on a Wiener filter minimizing errors between the original video and the reconstructed video and then, applying the derived filter coefficients to the reconstructed video.

The ALF application indicator transmitted in S310 may be transmitted, with being included in the sequence parameter set, the picture parameter set, the adaptive parameter set, the slice header, and the like. The ALF application indicator may be adaptive_loop_filter_flag. In addition, it is possible to implement signaling by including whether the ALF is applied to luma component and chroma component in each bit stream. In addition, it may be determined whether the ALF is applied in the CU unit or the video unit.

The ALF parameters transmitted in S320 will be described.

The ALF parameters may include at least one of a filter shape, a filter coefficient, a filter classification method, a filter index, a filter prediction method, and a filter performance maximum depth.

The encoder may determine the optimal filter shape among a plurality of filter shapes. In addition, the encoder may determine the filter coefficients used to apply the ALF. In this case, the filter coefficient may be one or more and may be encoded with other order exponential Golomb codes. In order to effectively encode the filter coefficient, the prediction encoding may be performed between the filter coefficients by methods such as differential pulse code modulation (DPCM), and the like, and any one of the filter coefficients may also be subjected to the prediction encoding from a sum of other filter coefficients. In addition, if it is determined that the ALF is applied, the filter may be selected using one of region-based adaptation (RA) and block-based adaptation (BA) as the filter classification method. For example, when the filter classification method is determined as the RA method, a value of alf_region_adaptation_flag is set to be 1 and when the filter classification method is determined as the BA method, the value of alf_region_adaptation_flag is set to be 0. When the RA method is used, any one of the plurality of filters per the split video region may be selected and when the BA method is used, any one of the plurality of filters may be selected in consideration of variations and directivity of samples. In this case, in order to indicate which filter is selected, the filter index within the ALF parameters may be used. In addition, the ALF may be applied only to the CU of the specific depth by padding the information regarding the maximum depth to which the ALF is applied into the bit streams.

Figure 8:
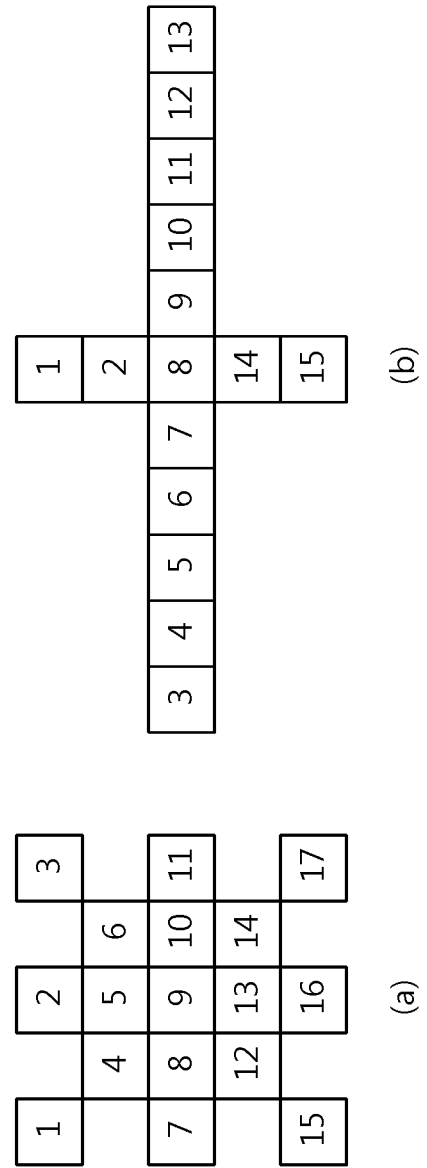
FIG. 8 shows an example of a filter shape determined by an encoder in the proposed video encoding method according to an embodiment of the present invention.

FIG. 8 shows an example of a filter shape determined by an encoder in the proposed video encoding method according to an embodiment of the present invention. Referring to FIG. 8, numbers within each filter represents the filter coefficient index. The encoder transmits the information regarding the filter shape and the filter classification method included in the ALF parameters to the decoder and the filter is selected according to the determined filter classification method. A maximum of 16 filters may be present. When the filtering is performed based on the selected filter, the filtering may be performed by a sum of a product of each filter coefficient and the sample values corresponding to each position upon filtering the sample values positioned at the center of the filter shape.

Meanwhile, when the filter is classified based on the BA method, the encoding parameters of at least one of the ALF applied target block and the neighboring blocks may be used. For example, the encoding parameters may include the tile boundary, and the tile boundary may be determined based on an identifier of the tile. Or, the encoding parameters may include the slice boundary, and the slice boundary may be determined based on an identifier of the slice.

Figure 9:
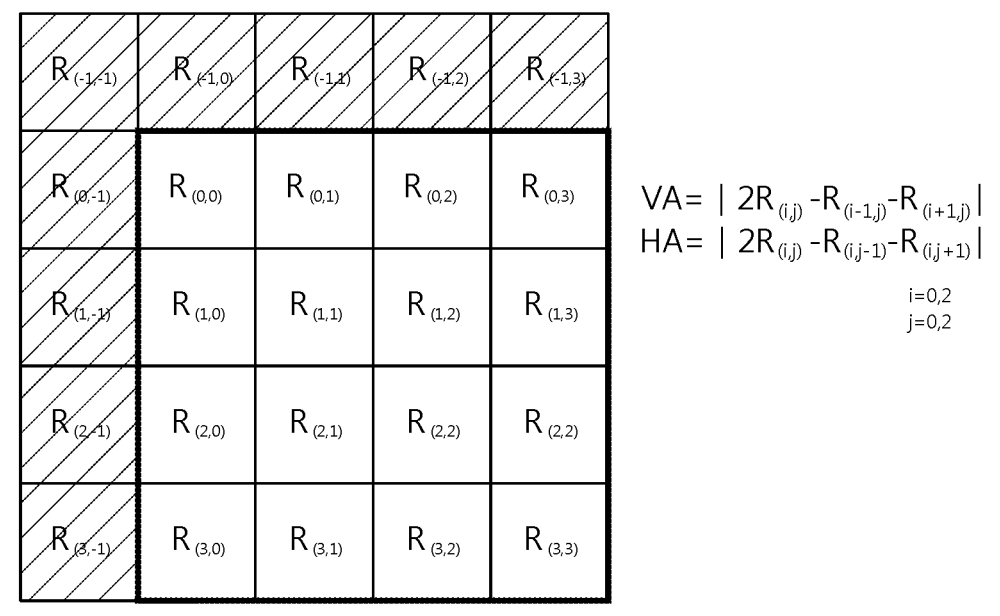

FIG. 9 shows a case in which a filter is classified based on a BA method by using encoding parameters in the proposed video encoding method according to an embodiment of the present invention. For example, in the case in which the ALF applied target block is intra-encoded and the neighboring blocks are inter-encoded, when horizontal or vertical directivity is determined in a 4×4 block unit, the samples within the 4×4 blocks that are not shaded in FIG. 9 become the samples of the intra block and the samples that are shaded may be the samples of the inter block. In addition, 'R' represents the reconstructed sample, VA represents vertical directivity, and HA represents horizontal directivity.

For example, it is assumed that the ALF applied target sample is included in the intra-encoded block and errors occur in the samples of the inter-encoded neighbor blocks, based on the BA method. In this case, the filter can be classified only by using the intra-encoded samples within the target block without using the samples of the inter-encoded block among the neighboring blocks. This is to prevent errors from being propagated to the samples of the intra-encoded block. Alternatively, the filter may be classified by substituting the samples of the inter-encoded block into the samples of the intra-encoded block without using the samples of the inter-encoded block among the neighboring blocks. For example, when the horizontal or vertical directivity is determined at position '$R_{(0,0)}$' in FIG. 9, the '$R_{(-1,0)}$' or '$R_{(0,-1)}$' value included in the inter block is substituted into the value of the intra block and then, the directivity may be determined. Alternatively, the filter may not be classified.

FIG. 10 shows an example of a case in which an ALF is applied using the encoding parameters in the proposed video encoding method according to an embodiment of the present invention.

Even when the ALF is applied, the ALF may be determined based on the encoding parameters of at least one of the ALF applied target block or the neighboring blocks of the target block. The encoding parameters may include the tile boundary, and the ALF may be applied based on the tile boundary. For example, the ALF may not be applied beyond the time boundary. Or, the encoding parameters may include the slice boundary, and the ALF may be applied based on the slice boundary. For example, the ALF may not be performed beyond the slice boundary.

Or, provided that the ALF applied target samples are included in the intra-encoded block and errors occur in the samples of the inter-encoded neighboring blocks, the ALF may be applied only by using the intra-encoded samples within the target block or among the neighboring blocks without using the samples of the inter-encoded block among the neighboring blocks. This is to prevent errors from being propagated to the samples of the intra-encoded block. When the filter shape of FIG. 8(a) is applied to the 4×4 block of FIG. 10(a), the position of the filtering target sample is number 9 at the center and the filter is applied using the neighboring sample values and the filter coefficients of the corresponding positions. In this case, as shown in FIG. 10(b), only when the filter coefficient is included in the intra-encoded block, the filter is applied. That is, the filter may be applied only to sample values i, j, k, l, m, n, o, and p. Alternatively, the ALF may be applied by substituting the samples of the inter-encoded block into the samples of the intra-encoded block without using the samples of the inter-encoded block among the neighboring blocks. Alternatively, the ALF may not be applied.

The encoder may apply the ALF based on the ALF application indicator and the ALF parameters. The ALF may be applied based on the encoding parameters of at least one of the ALF applied target block or the neighboring blocks of the target block.

Describing the above-mentioned process, the encoder synchronizes one slice with a coding tree block structure, determines whether the filter is performed in the CU unit, the filter performance maximum depth, the filter prediction method, the filter classification method, the filter shape, the filter coefficient, and the like, using the RDO, and may apply the ALF using the determined optimal ALF parameters. As described above, the ALF parameter may be entropy-encoded and then, transmitted to the decoder.

The video encoding method based on the constrained loop filter described above may be applied to the video decoding method as it is. That is, the decoder receives and parses the constrained loop filter indicator, the ALF application indicator, the ALF parameter, and the like, that are transmitted from the encoder and applies the ALF based thereon.

Figure 11:
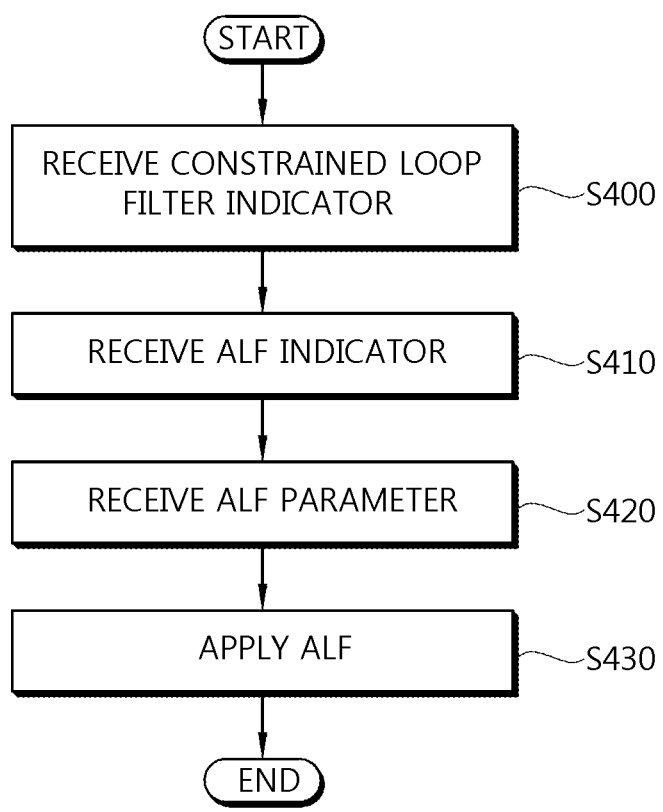
FIG. 11 shows another example of a proposed video decoding method according to an embodiment of the present invention.

FIG. 11 shows another example of a proposed video decoding method according to an embodiment of the present invention.

In S400, the decoder receives the constrained loop filter indicator from the encoder. Table 11 shows an example of the constrained loop filter indicator padded into a set of the picture parameters.

TABLE 11

| pic_parameter_set_rbsp( ) { | Descriptor |
|---|---|
| pic_parameter_set_id | ue(v) |
| seq_parameter_set_id | ue(v) |
| . . . . |  |
| constrained_intra_pred_flag | u(1) |
| if (constrained_intra_pred_flag) |  |
| constrained_in_loop_filter_flag | u(1) |
| . . . . |  |

In the above Table 11, when the value of constrained_intra_pred_flag is 1, that is, when the constrained intra prediction is performed, the decoder may parse the constrained_in_loop_filter_flag to determine whether the constrained in-loop filter is applied. When the value of constrained_in_loop_filter_flag is 1, it may indicate that the constrained in-loop filter is applied and when the value of constrained_in_loop_filter_flag is 0, it may indicate that the constrained in-loop filter is not applied. The applied target of the constrained in-loop filter may be at least one of the deblocking filter, the offset compensation, and the ALF.

In S410, the decoder receives the ALF application indicator indicating whether the ALF is applied from the encoder. The decoder may parse the ALF application indicator adaptive_loop_filter_enabled_flag transmitted while being included in the sequence parameter set, the picture parameter set, the adaptive parameter set, the slice header, and the like, within the bit streams to determine whether the ALF is applied. In addition, the decoder may parse the information regarding whether the ALF is applied to the luma component and the chroma component, respectively, whether the ALF in the CU unit is applied, and the like, from the bit streams.

In S420, the decoder receives the ALF parameters from the encoder.

The decoder may parse the ALF parameter transmitted from the encoder. The ALF parameters may include at least one of the filter shape, the filter coefficient, the filter classification method, the filter index, the filter prediction method, and the filter performance maximum depth. For example, the decoder may parse the bit streams to determine the filter shape and/or the filter coefficient. In this case, the number of filter coefficient may be one or more and may be decoded with other order exponential Golomb code. Further, in order to efficiently decode the filter coefficients, the prediction decoding may be performed between the filter coefficients by the methods such as DPCM, and the like, and any one of the filter coefficients may be prediction-decoded from the sum of other filter coefficients. In addition, the filter may be differently selected by using one of the RA method and the BA method as the filter classification method. For example, when the alf_region_adaptation_flag parsed by the encoder is set to be '1', the filter may be classified by the RA method and when the alf_region_adaptation_flag is set to be '0', the filter may be classified by the BA method. When the RA method is used, any one of the plurality of filters per the split video region may be selected and when the BA method is used, any one of the plurality of filters may be selected in consideration of variations and directivity of samples. In this case, in order to indicate which filter is selected, the filter index within the ALF parameters may be used.

When the block to which the applied target sample of the ALF belongs is intra-encoded and the block to which the neighboring samples belong is inter-encoded, a horizontal or vertical directivity may be determined by using only the samples of the intra block and the filter corresponding thereto may be determined. For example, Equation of FIG. 9 may be applied at positions $R_{(0,0)}$ and $R_{(0,2)}$ and $R_{(2,0)}$ and $R_{(2,2)}$ so as to determine the directivity in FIG. 9. In FIG. 9, when a portion to which a shadow is applied is inter-encoded and a white portion is intra-encoded, the decoder may determine the directivity at only $R_{(2,2)}$ position in which all of the applied target sample and the neighboring pixels of the ALF belong to a screen and the filter to be applied.

Meanwhile, the ALF parameters may be determined based on the encoding parameters of at least one of the ALF applied target block or the neighboring blocks of the target block.

In S430, the decoder performs the ALF based on the ALF application indicator and the ALF parameters. The decoder may apply the ALF based on the ALF application indicator and the ALF parameters. The ALF may be applied based on the encoding parameters of at least one of the ALF applied target block or the neighboring blocks of the target block. When the block to which the applied target sample of the ALF belongs is intra-encoded and the neighboring samples belong to the inter-encoded block, the applied target sample of the ALF may not be subjected to the ALF.

Figure 12:
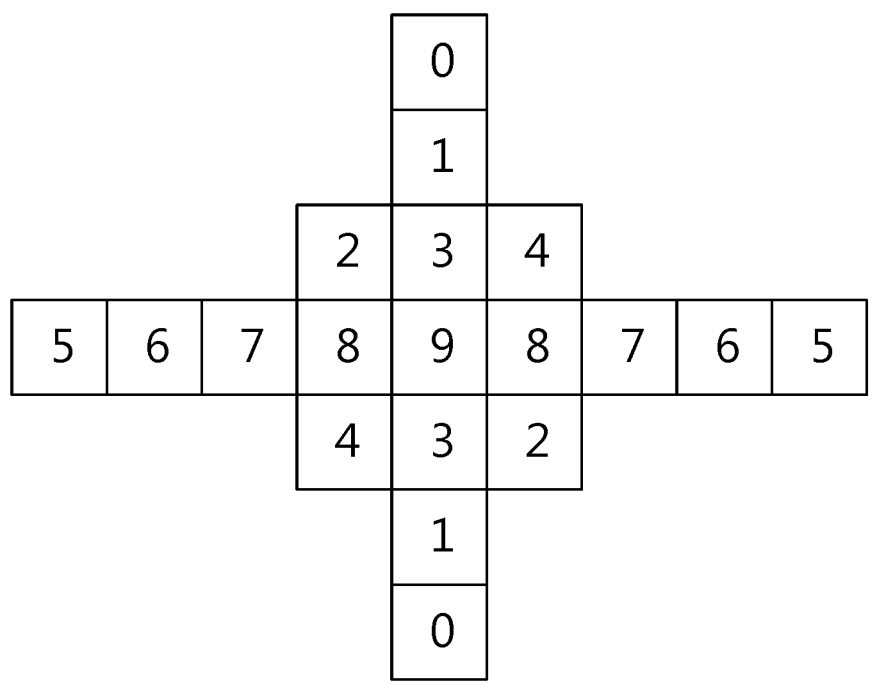
FIG. 12 shows an example of a filter shape used in the proposed video decoding method according to an embodiment of the present invention.

FIG. 12 shows an example of a filter shape used in the proposed video decoding method according to an embodiment of the present invention. In the filter shape as shown in FIG. 12, in the case in which the ALF is applied to the sample of position '9', the ALF may not be applied to the target sample when at least one sample around the applied target sample belongs to the inter-encoded block.

The present invention may be implemented by hardware and software or a combination thereof. Hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof that are designed to perform the above-mentioned functions. Software may be implemented by a module performing the above-mentioned function. The software may be stored in the memory unit and executed by the processor. As the memory unit or the processor, various units well-known to those skilled in the art may be adopted.

The exemplary embodiments of the present invention can apply the offset compensation or loop filter so as to withstand errors at the time of encoding and decoding video.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The invention claimed is:

1. An apparatus for decoding a video, the apparatus comprising:
   a decoder to decode:
   a constrained offset compensation indicator indicating whether at least one of a picture, a tile, and a coding unit (CU) supports constrained offset compensation,
   a sample adaptive offset (SAO) compensation indicator indicating whether to perform SAO compensation, and decode an SAO parameter; and
   a filter unit to perform SAO compensation on a target sample within a target block of a reconstructed video based on the SAO compensation indicator and the SAO parameter, wherein the filter unit determines an offset category for the SAO compensation based on the constrained offset compensation indicator and encoding parameters of the target block of SAO compensation and at least one of neighboring blocks of the target block when an edge offset is applied to the offset compensation target sample within the target block,
   wherein the SAO parameter comprises at least one of an offset type, an offset category information, an offset value and an offset sign, wherein the offset type specifies whether the edge offset is applied to the offset compensation target sample or a band offset is applied to the offset compensation target sample and the offset category information specifies the offsets classified according to locations of two neighboring samples of the offset compensation target sample.

2. The apparatus of claim 1, wherein the offset category information is determined by comparing values of the offset compensation target sample and two neighboring samples of the offset compensation target sample when the edge offset is applied to the offset compensation target sample.

* * * * *